United States Patent
Gwey

(10) Patent No.: US 11,438,827 B2
(45) Date of Patent: Sep. 6, 2022

(54) BAND STEERING SYSTEM

(71) Applicant: Realtek Singapore Private Limited, Singapore (SG)

(72) Inventor: Jia Qi Jacqueline Gwey, Singapore (SG)

(73) Assignee: REALTEK SINGAPORE PRIVATE LIMITED, Singapore (SG)

(*) Notice: Subject to any disclaimer, the term of this patent is extended or adjusted under 35 U.S.C. 154(b) by 26 days.

(21) Appl. No.: 17/124,653

(22) Filed: Dec. 17, 2020

(65) Prior Publication Data

US 2022/0201594 A1 Jun. 23, 2022

(51) Int. Cl.
| | | |
|---|---|---|
| H04W 48/14 | (2009.01) | |
| H04W 48/18 | (2009.01) | |
| H04W 48/16 | (2009.01) | |
| H04W 12/06 | (2021.01) | |
| H04W 24/08 | (2009.01) | |
| H04B 17/318 | (2015.01) | |
| H04W 48/10 | (2009.01) | |

(52) U.S. Cl.
CPC .......... *H04W 48/14* (2013.01); *H04B 17/318* (2015.01); *H04W 12/06* (2013.01); *H04W 24/08* (2013.01); *H04W 48/10* (2013.01); *H04W 48/16* (2013.01); *H04W 48/18* (2013.01)

(58) Field of Classification Search
CPC ..... H04W 48/14; H04W 48/10; H04W 48/16; H04W 48/18; H04W 12/06; H04W 24/08; H04B 17/318
USPC ......................................................... 370/329
See application file for complete search history.

(56) References Cited

U.S. PATENT DOCUMENTS

| | | | | |
|---|---|---|---|---|
| 10,779,342 | B2* | 9/2020 | Sahu ...................... | H04W 48/02 |
| 10,912,088 | B2* | 2/2021 | Katar ...................... | H04W 8/02 |
| 10,952,120 | B1* | 3/2021 | Ozkan .................... | H04W 36/30 |
| 10,959,144 | B2* | 3/2021 | Strater ................ | H04W 36/385 |
| 2012/0243474 | A1 | 9/2012 | Iyer et al. | |
| 2012/0275320 | A1* | 11/2012 | Iyer ........................ | H04L 5/006 370/252 |

(Continued)

FOREIGN PATENT DOCUMENTS

| | | | | |
|---|---|---|---|---|
| DE | 112013000764 T5 * | 12/2014 | ......... | H04L 63/1466 |
| TW | 201145909 A | 12/2011 | | |

(Continued)

*Primary Examiner* — Mong-Thuy T Tran
(74) *Attorney, Agent, or Firm* — McClure, Qualey & Rodack, LLP

(57) ABSTRACT

A band steering system includes a station and a wireless access point. The station broadcasts a probe request, where the probe request corresponds to a received signal strength indicator. The wireless access point monitors whether the probe request is in a first band or in a second band. When the wireless access point receives the probe request from the first band, the wireless access point determines whether the station is associated with the first band or the second band. When the station is not associated with the first band and the second band, the wireless access point blocks or responds to the probe request according to the received signal strength indicator and a first threshold. When the station is associated with the first band or the second band, the wireless access point blocks or responds to the probe request according to the received signal strength indicator and a second threshold.

16 Claims, 7 Drawing Sheets

(56) References Cited

U.S. PATENT DOCUMENTS

| | | | | |
|---|---|---|---|---|
| 2012/0322481 | A1* | 12/2012 | Laroche | ............... H04W 48/16 |
| | | | | 455/509 |
| 2014/0036848 | A1 | 2/2014 | Pease et al. | |
| 2015/0282032 | A1* | 10/2015 | Gupta | ............... H04W 72/0453 |
| | | | | 370/329 |
| 2016/0007278 | A1* | 1/2016 | Gupta | ................... H04W 76/10 |
| | | | | 370/329 |
| 2017/0041108 | A1* | 2/2017 | Iyer | ...................... H04W 16/14 |

FOREIGN PATENT DOCUMENTS

| | | | | |
|---|---|---|---|---|
| WO | WO-2018118454 A1 * | 6/2018 | ........... H04B 17/318 |
| WO | WO-2018213646 A1 * | 11/2018 | ........... H04B 17/318 |

* cited by examiner

BAND STEERING SYSTEM

BACKGROUND

Technical Field

The present invention relates to the field of band steering, and in particular, to a band steering system.

Related Art

As the science and technology nowadays are advanced increasingly, an increasing number of electronic apparatuses need to be connected to wireless networks. In the past, wireless network technologies only operated in a single band has become overloaded. Therefore, other bands are planned for use in the wireless network technologies. In other words, present wireless network technologies can be operated in multiband. Such bands are, for example, a common 2.4 GHz band and 5 GHz band. The 2.4 GHz band was generally used earlier in the development of the wireless network technologies. Relatively, the 5 GHz band was generally used later. However, a large proportion of electronic apparatuses nowadays are single band devices. In other words, such electronic apparatuses only support a wireless network having the 2.4 GHz band, but do not support a wireless network having the 5 GHz band, so that there is a network congestion problem in the 2.4 GHz band because of use by more electronic apparatuses, and there is seldom the network congestion problem in the 5 GHz band. Therefore, for multiband devices that can support both the 2.4 GHz band and the 5 GHz band, how to use band steering technologies to properly allocate such multi-band devices to the 2.4 GHz band or 5 GHz band has become an issue to be solved.

SUMMARY

In view of the above, the present invention provides a band steering system.

According to some embodiments, the band steering system is adapted to a first band and a second band. The band steering system includes a station and a wireless access point. The station is configured to broadcast a probe request. The probe request corresponds to a received signal strength indicator. The wireless access point is configured to monitor whether the probe request is in the first band or in the second band. When the wireless access point receives the probe request from the first band, the wireless access point determines whether the station is associated with the first band or the second band. When the station is not associated with the first band and the second band, the wireless access point blocks or responds to the probe request according to the received signal strength indicator and a first threshold. When the station is associated with the first band or the second band, the wireless access point blocks or responds to the probe request according to the received signal strength indicator and a second threshold.

According to some embodiments, the station is configured to send an association request. The association request corresponds to a received signal strength indicator. The wireless access point is configured to monitor whether the association request is in the first band or in the second band. When the wireless access point receives the association request from the first band, the wireless access point determines whether the station is associated with the first band or the second band. When the station is not associated with the first band and the second band, the wireless access point blocks or responds to the association request according to the received signal strength indicator, a third threshold, and a retry parameter. When the station is associated with the second band, the wireless access point blocks or responds to the association request according to the received signal strength indicator and a fourth threshold. When the station is associated with the first band, the wireless access point resets the retry parameter.

According to some embodiments, the band steering system is further adapted to a communication protocol. When the station is associated with the first band, the station sends an authentication request to the first band. The authentication request corresponds to the received signal strength indicator. When the station is associated with the second band, the station sends the authentication request to the second band. The wireless access point is configured to monitor whether the authentication request is in the first band or in the second band. When the wireless access point receives the association request from the first band, the wireless access point determines whether to enable the communication protocol between the wireless access point and the station according to the received signal strength indicator, a fifth threshold, a timer parameter, a link time, a request count, and a throughput. When the wireless access point receives the association request from the second band, the wireless access point determines whether to enable the communication protocol between the wireless access point and the station according to the received signal strength indicator, a sixth threshold, the timer parameter, the link time, the request count, and the throughput.

Based on the foregoing, based on some embodiments of the present invention, the band steering system can enable the wireless access point to perform different functions depending on whether the station is associated with the first band or the second band, that is, comparing the received signal strength indicator with different thresholds to block or respond to the probe request broadcast by the station. In some embodiments, in addition to comparing the received signal strength indicator with different thresholds, the band steering system further performs determining by using the value of the retry parameter to block or respond to the association request sent by the station. In some embodiments, in addition to comparing the received signal strength indicator with different thresholds, the band steering system further determines whether to enable the communication protocol between the wireless access point and the station according to the timer parameter, the link time, the request count, and the throughput.

DETAILED DESCRIPTION

Figure 1:
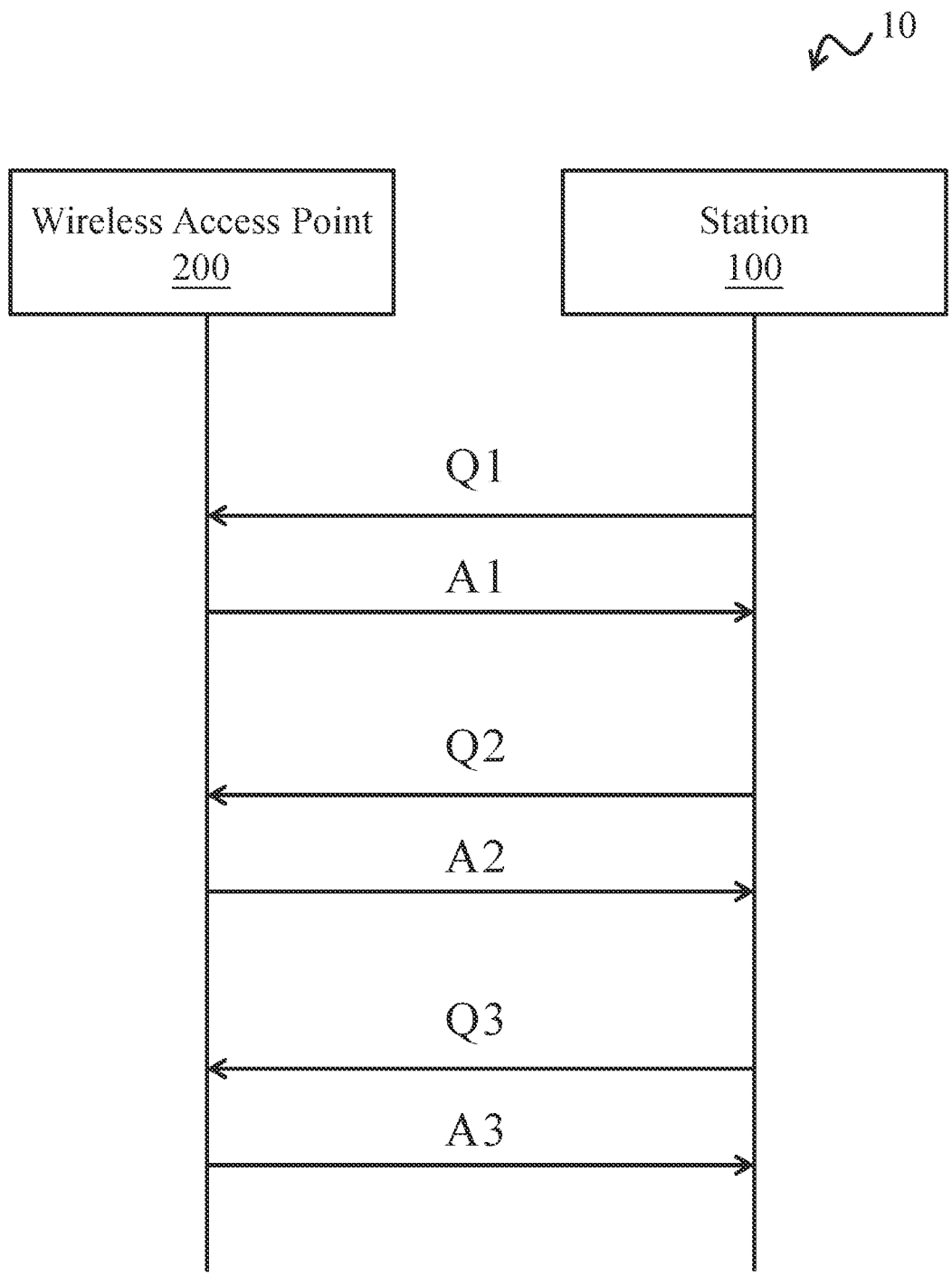
FIG. 1 is a schematic diagram of a band steering system according to some embodiments of the present invention.

FIG. 1 is a schematic diagram of a band steering system 10 according to some embodiments of the present invention. Referring to FIG. 1, in some embodiments, the band steering system 10 is adapted to a first band and a second band, and the band steering system 10 includes a station 100 and a wireless access point 200. The station 100 is configured to broadcast a probe request Q1, and the station 100 is configured to send an association request Q2 and an authentication request Q3. The wireless access point 200 is configured to receive the probe request Q1, the association request Q2, and the authentication request Q3 (hereinafter referred to "the probe request Q1, the association request Q2, and the authentication request Q3" as "request"). In addition, the wireless access point 200 can output a corresponding probe response A1, a corresponding association response A2, and a corresponding authentication response A3 (hereinafter referred to "the probe response A1, the association response A2, and the authentication response A3" as "response") to the station 100 according to the probe request Q1, the association request Q2, and the authentication request Q3. In detail, the station 100 can broadcast or send the requests through the first band or the second band. The wireless access point 200 obtains, by monitoring the first band and the second band, the requests broadcast or send by the station 100, and outputs responses through a corresponding channel (the first band or the second band). The station 100 then receives, from a corresponding channel, the responses output by the wireless access point 200. In other words, in some embodiments, when the station 100 broadcasts or sends the requests through the first band, the wireless access point 200 can monitor, through the first band, the requests broadcast or sent by the station 100, and output the responses through the first band. The station 100 then receives, from the first band, the responses output by the wireless access point 200. Similarly, in other embodiments, when the station 100 broadcasts or sends the requests through the second band, the wireless access point 200 can monitor, through the second band, the requests broadcast or sent by the station 100 and output the responses through the second band. The station 100 then receives, from the second band, the responses output by the wireless access point 200. It should be particularly noted that, for convenience of description, this specification mainly describes the station 100 broadcasting or sending the requests through the first band, but the present invention is not limited thereto. In some embodiments, the station 100 can broadcast or send the requests through the second band, or the station 100 can further broadcast or send the requests through other bands.

It should be particularly noted that, in some embodiments, the first channel is a preferred band and the second channel is a non-preferred band. For example, the first channel is a 5 GHz channel and the second channel is a 2.4 GHz channel. In some other embodiments, the first channel is a non-preferred band and the second channel is a preferred band. For example, the first channel is a 2.4 GHz channel and the second channel is a 5 GHz channel.

In some embodiments, the station 100 is configured to broadcast the probe request Q1. The probe request Q1 corresponds to a received signal strength indicator (RSSI). The wireless access point 200 is configured to monitor whether the probe request Q1 is in the first band or in the second band. When the wireless access point 200 receives the probe request Q1 from the first band, the wireless access point 200 determines whether the station 100 is associated with the first band or the second band. When the station 100 is not associated with the first band and the second band, the wireless access point 200 blocks or responds to the probe request Q1 according to the received signal strength indicator and a first threshold. When the station 100 is associated with the first band or the second band, the wireless access point 200 blocks or responds to the probe request Q1 according to the received signal strength indicator and a second threshold.

In detail, in some embodiments, the station 100 broadcasts the probe request Q1 to search for a wireless access point 200 suitable for link. When the station 100 broadcasts the probe request Q1 through the first channel, it represents that the station 100 intends to search for whether there is a wireless access point 200 suitable for link through the first channel. Similarly, when the station 100 broadcasts the probe request Q1 through the second channel, it represents that the station 100 intends to search for whether there is a wireless access point 200 suitable for link through the second channel. In other words, a probe request Q1 transmitted through the first channel may be referred to as a first channel probe request, and a probe request Q1 transmitted through the second channel may be referred to as a second channel probe request. Therefore, when the wireless access point 200 monitors the first band and the second band, the wireless access point can determine, through a receiving band (the first band or the second band), whether the probe request Q1 is the first channel probe request or the second channel probe request. In some embodiments, the probe request Q1 has information about whether the station 100 is associated with the first band or the second band. Therefore, the wireless access point 200 can determine, according to the probe request Q1, whether the station 100 is associated with the first band or the second band. Then, the wireless access point 200 compares the received signal strength indicator with different thresholds according to whether the station 100 is associated with the first band or the second band, and then determines to block or respond to the probe request Q1. The received signal strength indicator is used for representing signal strength between the station 100 and the wireless access point 200.

Figure 2:
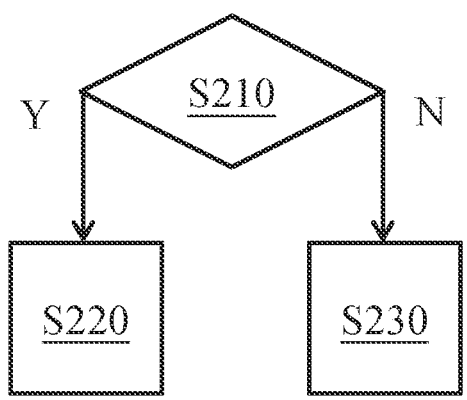
FIG. 2 is a flowchart of a first threshold comparison procedure according to some embodiments of the present invention.

FIG. 2 is a flowchart of a first threshold comparison procedure according to some embodiments of the present invention. Referring to FIG. 2, in some embodiments, when a station 100 is not associated with a first band and a second band, a wireless access point 200 blocks or responds to a probe request Q1 according to a first threshold comparison procedure. The first threshold comparison procedure includes the following steps: determining whether a received signal strength indicator is less than a first threshold (step S210); when the received signal strength indicator is less than the first threshold, blocking the probe request Q1 in response to the received signal strength indicator being less than the first threshold (step S220); and when the received signal strength indicator is not less than the first threshold, outputting a probe response A1 to the station 100 in response to the received signal strength indicator being not less than the first threshold (step S230). In some embodiments, the first threshold is a first channel threshold, such as "5 GHz threshold". In some other embodiments, the first threshold is a difference between the first channel threshold and a tolerance, for example, "5 GHz threshold-tolerance".

Figure 3:
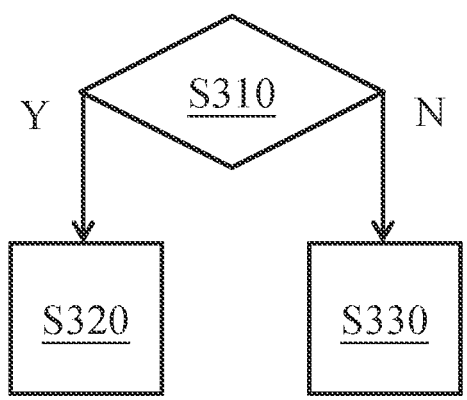
FIG. 3 is a flowchart of a second threshold comparison procedure according to some embodiments of the present invention.

FIG. 3 is a flowchart of a second threshold comparison procedure according to some embodiments of the present invention. Referring to FIG. 3, in some embodiments, when a station 100 is associated with a first band or a second band, a wireless access point 200 blocks or responds to a probe request Q1 according to the second threshold comparison procedure. The second threshold comparison procedure includes the following steps: determining whether a received signal strength indicator is less than a second threshold (step S310); when the received signal strength indicator is less than the second threshold, blocking the probe request Q1 in response to the received signal strength indicator being less than the second threshold (step S320); and when the received signal strength indicator is not less than the second threshold, outputting a probe response A1 to the station 100 in response to the received signal strength indicator being not less than the second threshold (step S330). In some embodiments, the second threshold is a second channel threshold, such as "2.4 GHz threshold".

Figure 4:
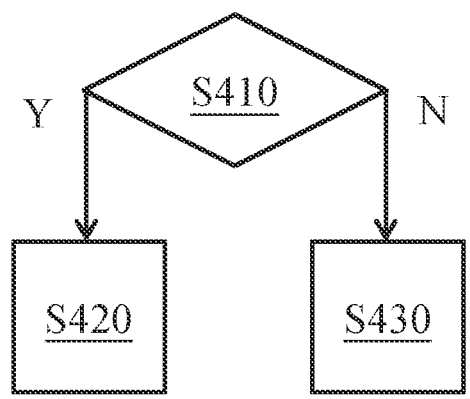
FIG. 4 is a flowchart of a first threshold comparison procedure according to some other embodiments of the present invention.

FIG. 4 is a flowchart of a first threshold comparison procedure according to some other embodiments of the present invention. Referring to FIG. 4, in some embodiments, when a station 100 is not associated with a first band and a second band, a wireless access point 200 blocks or responds to a probe request Q1 according to a first threshold comparison procedure. The first threshold comparison procedure includes the following steps: determining whether a received signal strength indicator is greater than a first threshold (step S410); when the received signal strength indicator is greater than the first threshold, blocking the probe request Q1 in response to the received signal strength indicator being greater than the first threshold (step S420); and when the received signal strength indicator is not greater than the first threshold, outputting a probe response A1 to the station 100 in response to the received signal strength indicator being not greater than the first threshold (step S430). In some embodiments, the first threshold is a second channel threshold, such as "2.4 GHz threshold".

Figure 5:
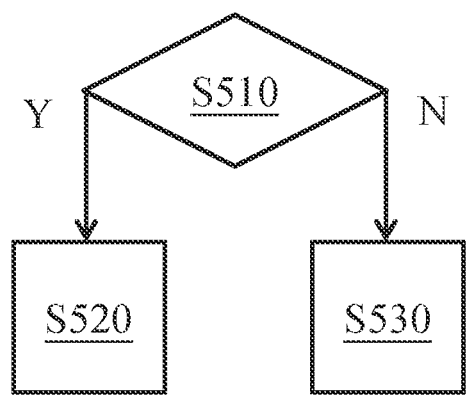
FIG. 5 is a flowchart of a second threshold comparison procedure according to some other embodiments of the present invention.

FIG. 5 is a flowchart of a second threshold comparison procedure according to some other embodiments of the present invention. Referring to FIG. 5, in some embodiments, when a station 100 is associated with a first band or a second band, a wireless access point 200 blocks or responds to a probe request Q1 according to the second threshold comparison procedure. The second threshold comparison procedure includes the following steps: determining whether a received signal strength indicator is greater than a second threshold (step S510); when the received signal strength indicator is greater than the second threshold, blocking the probe request Q1 in response to the received signal strength indicator being greater than the second threshold (step S520); and when the received signal strength indicator is not greater than the second threshold, outputting a probe response A1 to the station 100 in response to the received signal strength indicator being not greater than the second threshold (step S530). In some embodiments, the second threshold is a first channel threshold, such as "5 GHz threshold".

In some embodiments, the station 100 is configured to send an association request Q2. The association request Q2 corresponds to the received signal strength indicator. The wireless access point 200 is configured to monitor whether the association request Q2 is in the first band or in the second band. When the wireless access point 200 receives the association request Q2 from the first band, the wireless access point 200 determines whether the station 100 is associated with the first band or the second band. When the station 100 is not associated with the first band and the second band, the wireless access point 200 blocks or responds to the association request Q2 according to the received signal strength indicator, a third threshold, and a retry parameter. When the station 100 is associated with the second band, the wireless access point 200 blocks or responds to the association request Q2 according to the received signal strength indicator and a fourth threshold. When the station 100 is associated with the first band, the wireless access point 200 resets the retry parameter. That is, in some embodiments, when the station 100 is associated with the first band and sends the association request Q2 to the first band, the wireless access point 200 resets the retry parameter. In some embodiments, when the station 100 is associated with the second band and sends the association request Q2 to second band, the wireless access point 200 resets the retry parameter.

In detail, in some embodiments, the station 100 sends the association request Q2 to determine whether a channel is suitable for generating association. When the station 100 sends the association request Q2 through a first channel, it represents that the station 100 intends to determine whether the first channel is suitable for generating the association. Similarly, when the station 100 sends the association request Q2 through a second channel, it represents that the station 100 intends to determine whether the second channel is suitable for generating the association. In other words, an association request Q2 transmitted through the first channel may be referred to as a first channel association request, and an association request Q2 transmitted through the second channel may be referred to as a second channel association request. Therefore, when the wireless access point 200 monitors the first band and the second band, the wireless access point can determine, through a receiving band (the first band or the second band), whether the association request Q2 is the first channel association request or the second channel association request. In some embodiments, the association request Q2 has information about whether the station 100 is associated with the first band or the second band. Therefore, the wireless access point 200 can determine, according to the association request Q2, whether the station 100 is associated with the first band or the second band. Afterwards, the wireless access point 200 compares the received signal strength indicator with different thresholds according to whether the station 100 is associated with the first band or the second band, and then determines to block or respond to the association request Q2. When the station 100 is not associated with the first band and the second band, the retry parameter is further used for determining to block or respond to the association request Q2. It should be particularly noted that when the station 100 is associated with the first band, the wireless access point 200 resets the retry parameter. Because the station 100 is associated with the first band, there is no need for the station 100 to send the association request Q2 through the first channel, that is, there is no need to determine again whether the first channel is suitable for generating the association. Similarly, when the wireless access point 200 receives the association request Q2 through the second channel and the station 100 is associated with the second band, the wireless access point 200 resets the retry parameter. In some embodiments, the wireless access point 200 resets the retry parameter by setting the retry parameter to a value greater than zero.

It should be particularly noted that, in some embodiments, the station 100 can send the association request Q2 to the specific wireless access point 200, that is, the station 100 can send the association request Q2 to the wireless access point 200 with a specific media access control address (MAC address).

Figure 6:
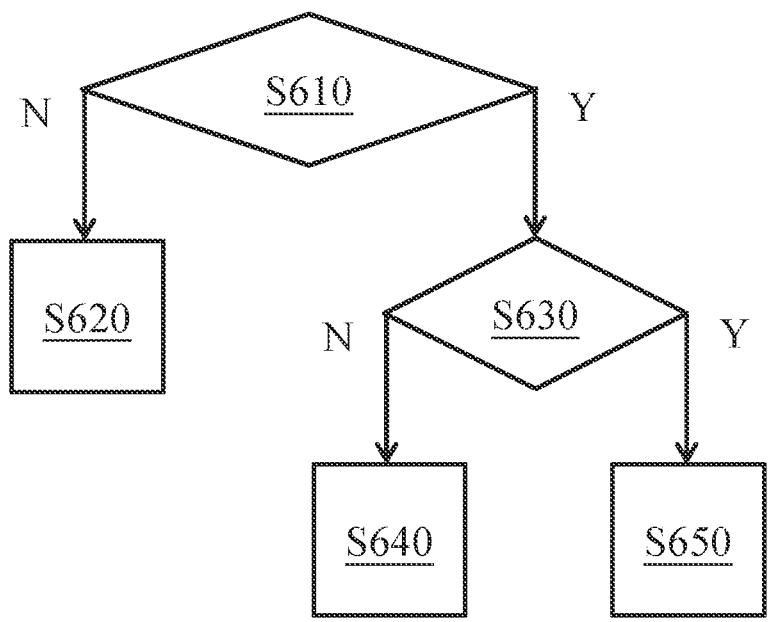
FIG. 6 is a flowchart of a third threshold comparison procedure according to some embodiments of the present invention.

FIG. 6 is a flowchart of a third threshold comparison procedure according to some embodiments of the present invention. Referring to FIG. 6, in some embodiments, when a station 100 is not associated with a first band and a second band, a wireless access point 200 blocks or responds to an association request Q2 according to the third threshold comparison procedure. The third threshold comparison procedure includes the following steps: determining whether a received signal strength indicator is less than a third threshold (step S610); when the received signal strength indicator is not less than the third threshold, outputting an association response A2 to the station 100 in response to the received signal strength indicator being not less than the third threshold (step S620); when the received signal strength indicator is less than the third threshold, determining, in response to the received signal strength indicator being less than the third threshold, whether a retry parameter is greater than a retry threshold (step S630); when the retry parameter is not greater than the retry threshold, outputting an association response A2 to the station 100 in response to the retry parameter being not greater than the retry threshold, (step S640); and when the retry parameter is greater than the retry threshold, in response to the retry parameter being greater than the retry threshold, blocking the association request Q2 and adjusting the retry parameter (step S650). In some embodiments, the adjusting the retry parameter in step S650 is to subtract 1 from a value of the retry parameter, that is, "retry parameter−1". In some embodiments, the third threshold is a first channel threshold, such as "5 GHz threshold". The retry parameter and the retry threshold may be determined by a user of a band steering system 10. For example, the retry parameter is "a value greater than 0" and the retry threshold is "0".

It should be particularly noted that, in some embodiments, after step S650 in the third threshold comparison procedure is performed, step S610 in the third threshold comparison procedure is re-performed. Therefore, the wireless access point 200 can repeatedly perform the third threshold comparison procedure until a case that the received signal strength indicator is not greater than the third threshold (step S620) or the retry parameter is not greater than the retry threshold (step S640) occurs. In that case, the wireless access point 200 outputs the association response A2 to the station 100.

Figure 7:
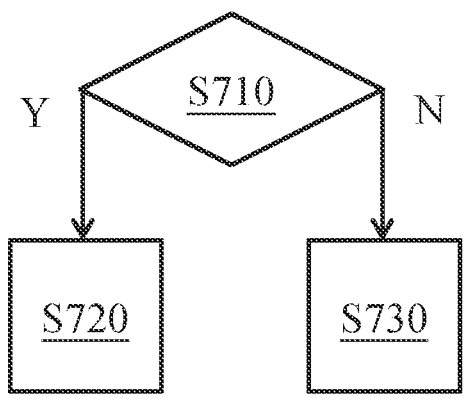
FIG. 7 is a flowchart of a fourth threshold comparison procedure according to some embodiments of the present invention.

FIG. 7 is a flowchart of a fourth threshold comparison procedure according to some embodiments of the present invention. Referring to FIG. 7, in some other embodiments, when the station 100 is associated with the second band, the wireless access point 200 blocks or responds to the association request Q2 according to the fourth threshold comparison procedure. The fourth threshold comparison procedure includes the following steps: determining whether a received signal strength indicator is less than a fourth threshold (step S710); when the received signal strength indicator is less than the fourth threshold, blocking the association request Q2 in response to the received signal strength indicator being less than the fourth threshold, (step S720); and when the received signal strength indicator is not less than the fourth threshold, outputting an association response A2 to the station 100 in response to the received signal strength indicator being not less than the fourth threshold (step S730). In some embodiments, the fourth threshold is a second channel threshold, such as "2.4 GHz threshold".

Figure 8:
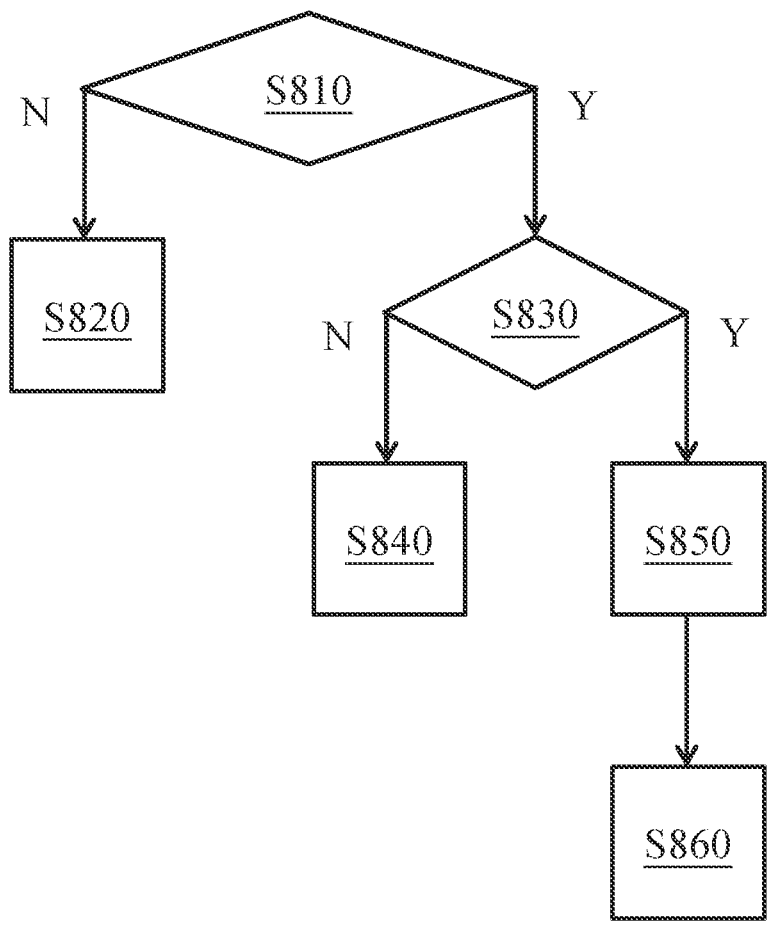
FIG. 8 is a flowchart of a third threshold comparison procedure according to some other embodiments of the present invention.

FIG. 8 is a flowchart of a third threshold comparison procedure according to some other embodiments of the present invention. Referring to FIG. 8, in some embodiments, when a station 100 is not associated with a first band and a second band, a wireless access point 200 blocks or responds to an association request Q2 according to the third threshold comparison procedure. The third threshold comparison procedure includes the following steps: determining whether a received signal strength indicator is greater than a third threshold (step S810); when the received signal strength indicator is not greater than the third threshold, outputting an association response A2 to the station 100 in response to the received signal strength indicator being not greater than the third threshold (step S820); when the received signal strength indicator is greater than the third threshold, determining, in response to the received signal strength indicator being greater than the third threshold, whether a retry parameter is greater than a retry threshold (step S830); when the retry parameter is not greater than the retry threshold, outputting an association response A2 to the station 100 in response to the retry parameter being not greater than the retry threshold, (step S840); and when the retry parameter is greater than the retry threshold, in response to the retry parameter being greater than the retry threshold, blocking the association request Q2 and adjusting the retry parameter (step S850). In some embodiments, the adjusting the retry parameter in step S850 is to subtract 1 from a value of the retry parameter, that is, "retry parameter−1". In some embodiments, the third threshold is a second channel threshold, such as "2.4 GHz threshold". The retry parameter and the retry threshold may be determined by a user of a band steering system 10. For example, the retry parameter is "a value greater than 0" and the retry threshold is "0".

It should be particularly noted that, in some embodiments, after step S850 in the third threshold comparison procedure is performed, step S810 in the third threshold comparison procedure is re-performed. Therefore, the wireless access point 200 can repeatedly perform the third threshold comparison procedure until a case that the received signal strength indicator is not greater than the third threshold (step S820) or the retry parameter is not greater than the retry threshold (step S840) occurs. In that case, the wireless access point 200 outputs the association response A2 to the station 100.

In some embodiments, the wireless access point 200 switches between a working mode and a hiding mode, and is configured to output a beacon to the station 100. When the wireless access point 200 is in the working mode, the beacon has wireless network information. When the wireless access point 200 is in the hiding mode, the beacon does not has the wireless network information. The third threshold comparison procedure further includes the following steps: when the received signal strength indicator is greater than the third threshold and the retry parameter is greater than the retry threshold, in response to the received signal strength indicator being greater than the third threshold and the retry parameter being greater than the retry threshold, switching the wireless access point 200 from the working mode to the hiding mode, and then switching the wireless access point 200 from the hiding mode to the working mode after a hidden period (step S860). In some embodiments, the wireless network information is, for example, a service set identifier (SSID) corresponding to the wireless access point 200.

It should be particularly noted that, in some embodiments, after step S860 in the third threshold comparison procedure is performed, step S810 in the third threshold comparison procedure is re-performed. Therefore, the wireless access point 200 can repeatedly perform the third threshold comparison procedure. However, when the received signal strength indicator is greater than the third threshold and the retry parameter is greater than the retry threshold (step S860), the wireless access point 200 may be hidden relative to the station 100 for a period of time (the hiding period).

Figure 9:
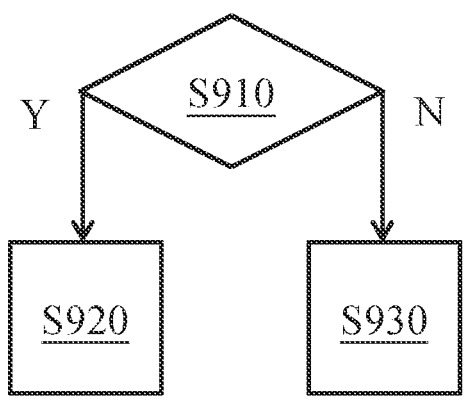
FIG. 9 is a flowchart of a fourth threshold comparison procedure according to some other embodiments of the present invention.

FIG. 9 is a flowchart of a fourth threshold comparison procedure according to some other embodiments of the present invention. Referring to FIG. 9, in some other embodiments, when the station 100 is associated with the second band, the wireless access point 200 blocks or responds to the association request Q2 according to the fourth threshold comparison procedure. The fourth threshold comparison procedure includes the following steps: determining whether a received signal strength indicator is greater than a fourth threshold (step S910); when the received signal strength indicator is greater than the fourth threshold, blocking the association request Q2 in response to the received signal strength indicator being greater than the fourth threshold, (step S920); and when the received signal strength indicator is not greater than the fourth threshold, outputting an association response A2 to the station 100 in response to the received signal strength indicator being not greater than the fourth threshold (step S930). In some embodiments, the fourth threshold is a first channel threshold, such as "5 GHz threshold".

In some embodiments, a band steering system 10 is further adapted to a communication protocol. When the station 100 is associated with the first band, the station 100 sends an authentication request Q3 to the first band. The authentication request Q3 corresponds to the received signal strength indicator. When the station 100 is associated with the second band, the station 100 sends the authentication request Q3 to the second band. The wireless access point 200 is configured to monitor whether the authentication request Q3 is in the first band or in the second band. When the wireless access point 200 receives the authentication request Q3 from the first band, the wireless access point 200 determines whether to enable the communication protocol between the wireless access point 200 and the station 100 according to the received signal strength indicator, a fifth threshold, a timer parameter, a link time, a request count, and a throughput. When the wireless access point 200 receives the authentication request Q3 from the second band, the wireless access point 200 determines, according to the received signal strength indicator, a sixth threshold, the timer parameter, the link time, the request count, and the throughput, whether to enable the communication protocol between the wireless access point 200 and the station 100.

In detail, in some embodiments, the station 100 sends the authentication request Q3 to determine whether a channel for its association can be authenticated by the wireless access point 200. When the authentication request Q3 can be authenticated by the wireless access point 200, that is, when the wireless access point 200 outputs a corresponding authentication response A3, a communication protocol may be reached between the station 100 and the wireless access point 200. In some embodiments, the communication protocol is, for example, "802.11v". It should be particularly noted that the wireless access point 200 can compare the received signal strength indicator with different thresholds according to whether the station 100 authenticates the first band or the second band, so as to determine whether to block the authentication request Q3. When the received signal strength indicator meets threshold comparison, it is determined whether to block or respond to the authentication request Q3 according to the timer parameter, the link time, the request count, and the throughput, that is, it is determined whether to enable the communication protocol between the wireless access point 200 and the station 100.

In some embodiments, the station 100 can send the authentication request Q3 to the specific wireless access point 200, that is, the station 100 can send the authentication request Q3 to the wireless access point 200 with a specific media access control address.

It should be particularly noted that, in some embodiments, when the station 100 is associated with the first band and sends the authentication request Q3 to the first band, the wireless access point 200 resets the retry parameter. In some embodiments, when the station 100 is associated with the second band and sends the authentication request Q3 to second band, the wireless access point 200 resets the retry parameter.

Figure 10:
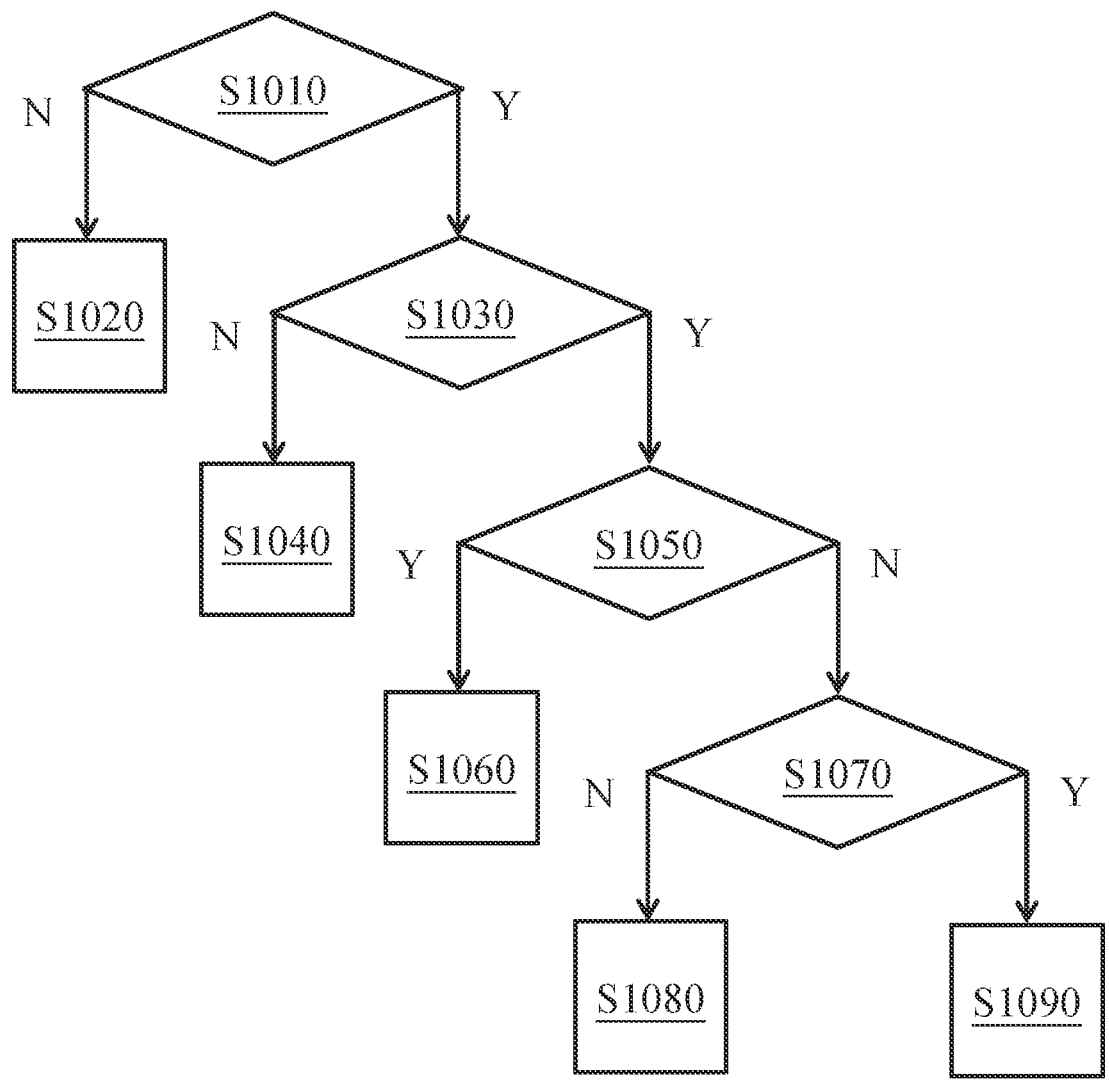
FIG. 10 is a flowchart of a fifth threshold comparison procedure according to some embodiments of the present invention.

FIG. 10 is a flowchart of a fifth threshold comparison procedure according to some embodiments of the present invention. Referring to FIG. 10, in some embodiments, when a wireless access point 200 receives an authentication request Q3 from a first band, the wireless access point 200 determines, according to the fifth threshold comparison procedure, whether to enable a communication protocol between the wireless access point 200 and a station 100. The fifth threshold comparison procedure includes the following steps: determining whether a received signal strength indicator meets a fifth threshold (step S1010); when the received signal strength indicator does not meet the fifth threshold, in response to the received signal strength indicator not meeting the fifth threshold, resetting a timer parameter, and disabling the communication protocol between the wireless access point 200 and the station 100 (step S1020); when the received signal strength indicator meets the fifth threshold, determining, in response to the received signal strength indicator meeting the fifth threshold, whether the timer parameter meets a first time threshold (step S1030); in response to the timer parameter not meeting the first time threshold, adjusting the timer parameter, and disabling the communication protocol between the wireless access point 200 and the station 100 (step S1040); determining, in response to the timer parameter meeting the first time threshold, whether the station 100 supports the communication protocol and whether the request count is less than a count threshold (step S1050); enabling, in response to the station 100 supporting the communication protocol and the request count being less than the count threshold, the communication protocol between the wireless access point 200 and the station 100 (step S1060); determining, in response to the station 100 not supporting the communication protocol or the request count being not less than the count threshold, whether a link time meets a second time threshold and whether a throughput meets a throughput threshold (step S1070); disabling the communication protocol between the wireless access point 200 and the station 100 in response to the link time not meeting the second time threshold or the throughput meeting the throughput threshold (step S1080); and de-authenticating the station 100 in response to the link time meeting the second time threshold and the throughput not meeting the throughput threshold (step S1090). In some embodiments, the fifth threshold is a second channel threshold, such as "2.4 GHz threshold". The adjusting the timer parameter in step S1040 is to add 1 to a value of the timer parameter, that is, "timer parameter+1". The first time threshold, the second time threshold, the request count, and the throughput threshold can be determined by a user of the band steering system 10. For example, the first time threshold is "0", the second time threshold is "20 seconds", and the request count is "10".

It should be particularly noted that, in some embodiments, after step S1020, step S1040, or step S1080 in the fifth threshold comparison procedure is performed, step S1010 in the fifth threshold comparison procedure is re-performed. Therefore, the wireless access point 200 can repeatedly perform the fifth threshold comparison procedure until a case that the station 100 supports the communication protocol and the request count is less than the count threshold (step S1060) occurs. In that case, the wireless access point 200 outputs the authentication response A3 to the station 100, that is, the communication protocol between the wireless access point 200 and the station 100 is enabled. Alternatively, the wireless access point 200 can repeatedly perform the fifth threshold comparison procedure until a case that the link time meets the second time threshold and the throughput does not meet the throughput threshold (step S1090) occurs. In that case, the wireless access point 200 de-authenticates the station 100, that is, the station 100 is steered to be switched to other channels for link, so as to block the authentication request Q3. For example, the station 100 is switched to the second channel, so that the station 100 needs to broadcast the probe request Q1 and send the association request Q2 and the authentication request Q3 through the second channel again to link the wireless access point 200.

Figure 11:
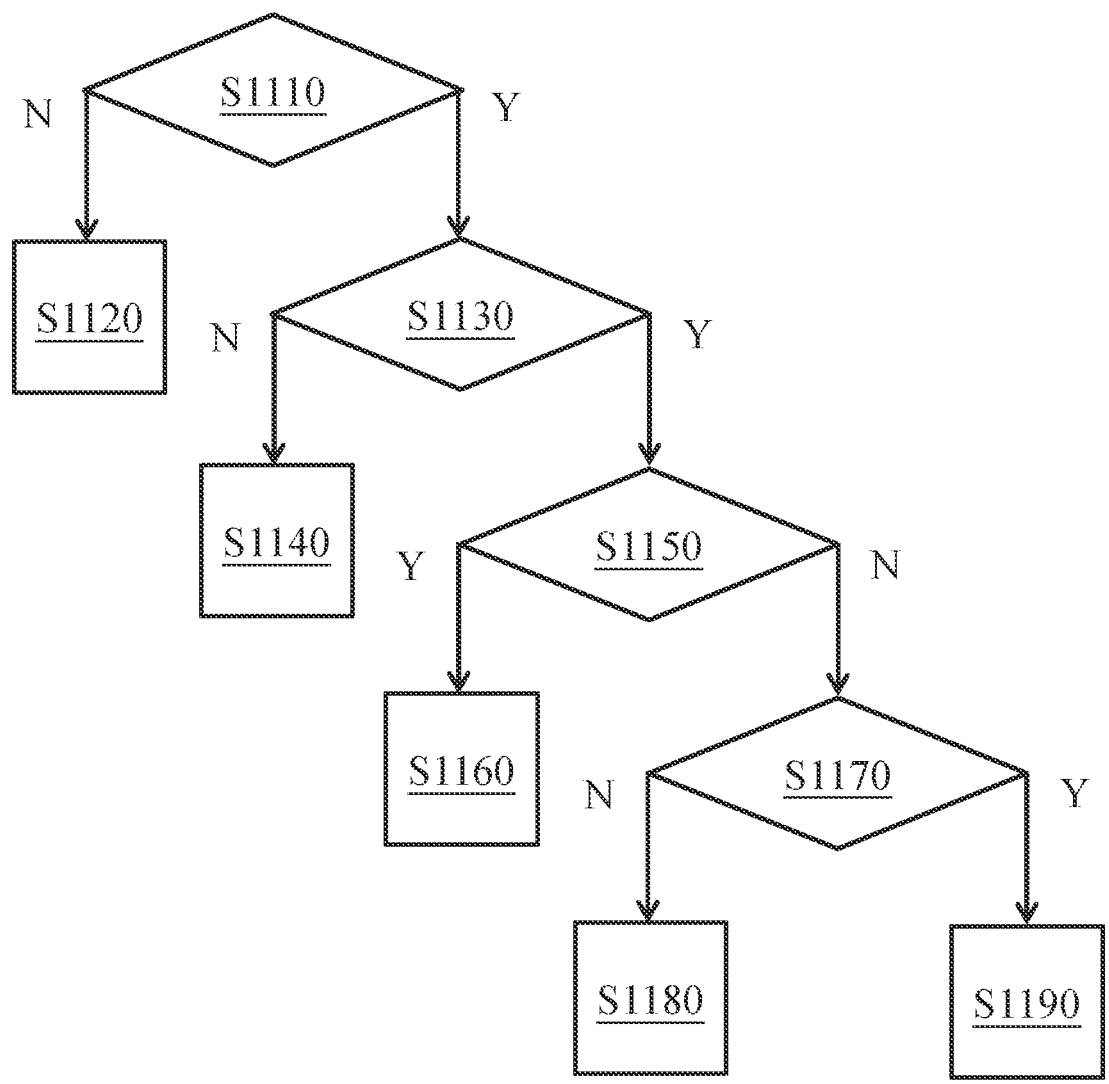
FIG. 11 is a flowchart of a sixth threshold comparison procedure according to some embodiments of the present invention.

FIG. 11 is a flowchart of a sixth threshold comparison procedure according to some embodiments of the present invention. Referring to FIG. 11, in some embodiments, when a wireless access point 200 receives an authentication request Q3 from a second band, the wireless access point 200 determines, according to the sixth threshold comparison procedure, whether to enable a communication protocol between the wireless access point 200 and a station 100. The sixth threshold comparison procedure includes the following steps: determining whether a received signal strength indicator meets a sixth threshold (step S1110); when the received signal strength indicator does not meet the sixth threshold, in response to the received signal strength indicator not meeting the sixth threshold, resetting a timer parameter, and disabling the communication protocol between the wireless access point 200 and the station 100 (step S1120); when the received signal strength indicator meets the sixth threshold, determining, in response to the received signal strength indicator meeting the sixth threshold, whether the timer parameter meets a first time threshold (step S1130); in response to the timer parameter not meeting the first time threshold, adjusting the timer parameter, and disabling the communication protocol between the wireless access point 200 and the station 100 (step S1140); determining, in response to the timer parameter meeting the first time threshold, whether the station 100 supports the communication protocol and whether the request count is less than a count threshold (step S1150); enabling, in response to the station 100 supporting the communication protocol and the request count being less than the count threshold, the communication protocol between the wireless access point 200 and the station 100 (step S1160); determining, in response to the station 100 not supporting the communication protocol or the request count being not less than the count threshold, whether a link time meets a second time threshold and whether a throughput meets a throughput threshold (step S1170); disabling the communication protocol between the wireless access point 200 and the station 100 in response to the link time not meeting the second time threshold or the throughput meeting the throughput threshold (step S1180); and de-authenticating the station 100 in response to the link time meeting the second time threshold and the throughput not meeting the throughput threshold (step S1190). In some embodiments, the sixth threshold is a first channel threshold, such as "5 GHz threshold". The adjusting the timer parameter in step S1140 is to add 1 to a value of the timer parameter, that is, "timer parameter+1". The first time threshold, the second time threshold, the request count, and the throughput threshold can be determined by a user of the band steering system 10. For example, the first time threshold is "0", the second time threshold is "20 seconds", and the request count is "10".

It should be particularly noted that, in some embodiments, after step S1120, step S1140, or step S1180 in the sixth threshold comparison procedure is performed, step S1110 in the sixth threshold comparison procedure is re-performed. Therefore, the wireless access point 200 can repeatedly perform the sixth threshold comparison procedure until a case that the station 100 supports the communication protocol and the request count is less than the count threshold (step S1160) occurs. In that case, the wireless access point 200 outputs the authentication response A3 to the station 100, that is, the communication protocol between the wireless access point 200 and the station 100 is enabled. Alternatively, the wireless access point 200 can repeatedly perform the sixth threshold comparison procedure until a case that the link time meets the second time threshold and the throughput does not meet the throughput threshold (step S1190) occurs. In that case, the wireless access point 200 de-authenticates the station 100, that is, the station 100 is steered to be switched to other channels for link, so as to block the authentication request Q3. For example, the station 100 is switched to the first channel, so that the station 100 needs to broadcast the probe request Q1 and send the association request Q2 and the authentication request Q3 through the first channel again to link the wireless access point 200.

Based on the foregoing, based on some embodiments of the present invention, the band steering system can enable the wireless access point to perform different functions depending on whether the station is associated with the first band or the second band, that is, comparing the received signal strength indicator with different thresholds to block or respond to the probe request broadcast by the station. In some embodiments, in addition to comparing the received signal strength indicator with different thresholds, the band steering system further performs determining by using the value of the retry parameter to block or respond to the association request sent by the station. In some embodiments, in addition to comparing the received signal strength indicator with different thresholds, the band steering system further determines, according to the timer parameter, the link time, the request count, and the throughput, whether to enable the communication protocol between the wireless access point and the station according to the authentication request sent by the station.

What is claimed is:

1. A band steering system adapted to a first band and a second band, wherein the band steering system comprises:
   a station configured to broadcast a probe request, wherein the probe request corresponds to a received signal strength indicator; and
   a wireless access point configured to monitor whether the probe request is in the first band or in the second band;
   wherein when the wireless access point receives the probe request from the first band, the wireless access point determines whether the station is associated with the first band or the second band;
   wherein when the station is not associated with the first band and the second band, the wireless access point compares the received signal strength indicator corresponding to the probe request and a first threshold according to a first threshold comparison process so as to block or respond to the probe request; and
   wherein when the station is associated with the first band or the second band, the wireless access point compares the received signal strength indicator corresponding to the probe request and a second threshold according to a second threshold comparison process so as to block or respond to the probe request.

2. The band steering system according to claim 1, wherein the first threshold comparison procedure comprises:
   in response to the received signal strength indicator corresponding to the probe request being less than the first threshold, blocking the probe request; and
   in response to the received signal strength indicator corresponding to the probe request being not less than the first threshold, outputting a probe response to the station; and
   the second threshold comparison procedure comprises:
   in response to the received signal strength indicator corresponding to the probe request being less than the second threshold, blocking the probe request; and
   in response to the received signal strength indicator corresponding to the probe request being not less than the second threshold, outputting the probe response to the station.

3. The band steering system according to claim 1, wherein the first threshold comparison procedure comprises:
   in response to the received signal strength indicator corresponding to the probe request being greater than the first threshold, blocking the probe request; and
   in response to the received signal strength indicator corresponding to the probe request being not greater than the first threshold, outputting a probe response to the station; and
   the second threshold comparison procedure comprises:
   in response to the received signal strength indicator corresponding to the probe request being greater than the second threshold, blocking the probe request; and
   in response to the received signal strength indicator corresponding to the probe request being not greater than the second threshold, outputting the probe response to the station.

4. The band steering system according to claim 1, wherein the first band is a preferred band and the second band is a non-preferred band.

5. The band steering system according to claim 4, wherein the first band is a 5 GHz band and the second band is a 2.4 GHz band.

6. A band steering system adapted to a first band and a second band, wherein the band steering system comprises:
   a station configured to broadcast a probe request, wherein the probe request corresponds to a received signal strength indicator; and
   a wireless access point configured to monitor whether the probe request is in the first band or in the second band;
   wherein when the wireless access point receives the probe request, the wireless access point determines whether the station is associated with the first band or the second band and blocks or responds to the probe request according to the received signal strength indicator corresponding to the probe request;
   wherein the station is configured to send an association request;
   wherein the wireless access point is configured to monitor whether the association request is in the first band or in the second band;
   wherein when the wireless access point receives the association request, the wireless access point determines whether the station is associated with the first band or the second band;
   wherein when the station is not associated with the first band and the second band, the wireless access point blocks or responds to the association request according to the received signal strength indicator corresponding to the association request, a third threshold, and a retry parameter;
   wherein when the station is associated with the second band, the wireless access point blocks or responds to the association request according to the received signal strength indicator corresponding to the association request and a fourth threshold; and
   wherein when the station is associated with the first band, the wireless access point resets the retry parameter.

7. The band steering system according to claim 6, wherein when the station is not associated with the first band and the second band, the wireless access point blocks or responds to the association request according to a third threshold comparison procedure, wherein the third threshold comparison procedure comprises:
   in response to the received signal strength indicator corresponding to the association request being less than the third threshold, determining whether the retry parameter is greater than a retry threshold;
   in response to the retry parameter being greater than the retry threshold, blocking the association request, and adjusting the retry parameter; and
   in response to the retry parameter being not greater than the retry threshold, outputting an association response to the station; and
   in response to the received signal strength indicator corresponding to the association request being not less than the third threshold, outputting the association response to the station; and
   when the station is associated with the second band, the wireless access point blocks or responds to the association request according to a fourth threshold comparison procedure, wherein the fourth threshold comparison procedure comprises:
   in response to the received signal strength indicator corresponding to the association request being less than the fourth threshold, blocking the association request; and in response to the received signal strength indicator corresponding to the association request being not less than the fourth threshold, outputting the association response to the station.

8. The band steering system according to claim 6, wherein when the station is not associated with the first band and the second band, the wireless access point blocks or responds to the association request according to a third threshold comparison procedure, wherein the third threshold comparison procedure comprises:
in response to the received signal strength indicator corresponding to the association request being greater than the third threshold, determining whether the retry parameter is greater than a retry threshold;
in response to the retry parameter being greater than the retry threshold, blocking the association request, and adjusting the retry parameter; and
in response to the retry parameter being not greater than the retry threshold, outputting an association response to the station; and
in response to the received signal strength indicator corresponding to the association request being not greater than the third threshold, outputting the association response to the station; and
when the station is associated with the second band, the wireless access point blocks or responds to the association request according to a fourth threshold comparison procedure, wherein the fourth threshold comparison procedure comprises:
in response to the received signal strength indicator corresponding to the association request being greater than the fourth threshold, blocking the association request; and
in response to the received signal strength indicator corresponding to the association request being not greater than the fourth threshold, outputting the association response to the station.

9. The band steering system according to claim 6, wherein the wireless access point switches between a working mode and a hiding mode, and is configured to output a beacon to the station;
wherein when the wireless access point is in the working mode, the beacon has wireless network information; and
wherein when the wireless access point is in the hiding mode, the beacon does not has the wireless network information; and
wherein the third threshold comparison procedure further comprises: in response to the received signal strength indicator corresponding to the association request being greater than the third threshold and the retry parameter being greater than the retry threshold, switching the wireless access point from the working mode to the hiding mode, and then switching the wireless access point from the hiding mode to the working mode after a hidden period.

10. The band steering system according to claim 6, wherein the first band is a preferred band, and the second band is a non-preferred band.

11. The band steering system according to claim 10, wherein the first band is a 5 GHz band, and the second band is a 2.4 GHz band.

12. A band steering system adapted to a first band and a second band, wherein the band steering system comprises:
a station configured to broadcast a probe request; and
a wireless access point configured to monitor whether the probe request is in the first band or in the second band;
wherein when the wireless access point receives the probe request, the wireless access point determines whether the station is associated with the first band or the second band and blocks or responds to the probe request according to the received signal strength indicator corresponding to the probe request;
wherein the band steering system is further adapted to a communication protocol, wherein when the station is associated with the first band, the station sends an authentication request to the first band;
wherein the wireless access point is configured to monitor whether the authentication request is in the first band or in the second band;
wherein when the wireless access point receives the authentication request from the first band, the wireless access point determines whether to enable the communication protocol between the wireless access point and the station according to the received signal strength indicator corresponding to the authentication request, a fifth threshold, a timer parameter, a link time, a request count, and a throughput; and
wherein when the wireless access point receives the authentication request from the second band, the wireless access point determines whether to enable the communication protocol between the wireless access point and the station according to the received signal strength indicator corresponding to the authentication request, a sixth threshold, the timer parameter, the link time, the request count, and the throughput.

13. The band steering system according to claim 12, wherein
when the wireless access point receives the authentication request from the first band, the wireless access point determines whether to enable the communication protocol between the wireless access point and the station according to a fifth threshold comparison procedure, wherein the fifth threshold comparison procedure comprises:
determining whether the received signal strength indicator corresponding to the authentication request meets the fifth threshold;
in response to the received signal strength indicator corresponding to the authentication request not meeting the fifth threshold, resetting the timer parameter, and disabling the communication protocol between the wireless access point and the station; and
in response to the received signal strength indicator corresponding to the authentication request meeting the fifth threshold, determining whether the timer parameter meets a first time threshold; and
when the wireless access point receives the authentication request from the second band, the wireless access point determines whether to enable the communication protocol between the wireless access point and the station according to a sixth threshold comparison procedure, wherein the sixth threshold comparison procedure comprises:
determining whether the received signal strength indicator corresponding to the authentication request meets the sixth threshold;
in response to the received signal strength indicator corresponding to the authentication request not meeting the sixth threshold, resetting the timer parameter, and disabling the communication protocol between the wireless access point and the station; and
in response to the received signal strength indicator corresponding to the authentication request meeting the sixth threshold, determining whether the timer parameter meets the first time threshold.

14. The band steering system according to claim 13, wherein the fifth threshold comparison procedure and the sixth threshold comparison procedure further comprise:
   in response to the timer parameter not meeting the first time threshold, adjusting the timer parameter, and disabling the communication protocol between the wireless access point and the station; and
   in response to the timer parameter meeting the first time threshold, determining whether the station supports the communication protocol, and determining whether the request count is less than a count threshold;
   in response to the station supporting the communication protocol and the request count being less than the count threshold, enabling the communication protocol between the wireless access point and the station; and
   in response to the station not supporting the communication protocol or the request count being not less than the count threshold, determining whether the link time meets a second time threshold, and determining whether the throughput meets a throughput threshold;
   in response to the link time not meeting the second time threshold or the throughput meeting the throughput threshold, disabling the communication protocol between the wireless access point and the station; and
   in response to the link time meeting the second time threshold and the throughput not meeting the throughput threshold, de-authenticating the station.

15. The band steering system according to claim 12, wherein the first band is a preferred band, and the second band is a non-preferred band.

16. The band steering system according to claim 15, wherein the first band is a 5 GHz band, and the second band is a 2.4 GHz band.

* * * * *